United States Patent
Birk et al.

(10) Patent No.: US 11,794,689 B2
(45) Date of Patent: Oct. 24, 2023

(54) METHOD FOR A DYNAMIC FIXATION

(71) Applicant: DAIMLER AG, Stuttgart (DE)

(72) Inventors: Karl Birk, Ebersbach (DE); Ralf Bogenrieder, Stuttgart (DE); Uwe Merz, Stuttgart (DE); Christian Nierla, Weinstadt (DE); Martin Seyffert, Pfullingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 656 days.

(21) Appl. No.: 17/040,807

(22) PCT Filed: Mar. 20, 2019

(86) PCT No.: PCT/EP2019/056903
§ 371 (c)(1),
(2) Date: Sep. 23, 2020

(87) PCT Pub. No.: WO2019/185407
PCT Pub. Date: Oct. 3, 2019

(65) Prior Publication Data
US 2021/0001801 A1    Jan. 7, 2021

(30) Foreign Application Priority Data
Mar. 28, 2018  (DE) ...................... 10 2018 002 559.5

(51) Int. Cl.
*B60R 22/46*    (2006.01)
*B60R 21/0132*    (2006.01)

(52) U.S. Cl.
CPC .......... *B60R 22/46* (2013.01); *B60R 21/0132* (2013.01); *B60R 2021/01322* (2013.01); *B60R 2022/4685* (2013.01)

(58) Field of Classification Search
CPC ................ B60R 22/46; B60R 21/0132; B60R 2021/01322; B60R 2022/4685
See application file for complete search history.

(56) References Cited

U.S. PATENT DOCUMENTS 8,775,030 B2   7/2014 Mages
9,150,194 B2*  10/2015 Erlacher ............... B60R 21/013
2007/0102915 A1  5/2007 Odate
(Continued)

FOREIGN PATENT DOCUMENTS

CN    102470815 A    5/2012
DE    102007002704 A1    7/2008
(Continued)

OTHER PUBLICATIONS

Office Action dated Feb. 16, 2022 in related/corresponding CN Application No. 201980022338.8.
(Continued)

Primary Examiner — Alan D Hutchinson
(74) Attorney, Agent, or Firm — PATENT PORTFOLIO BUILDERS PLLC

(57) ABSTRACT

A method for the dynamic fixation of an occupant wearing a seatbelt on a vehicle seat involves determining a lateral acceleration of the vehicle and a road course ahead of the vehicle. The seatbelt is tightened with a predetermined belt force for a predetermined period of time before entering a bend having a certain curvature.

8 Claims, 1 Drawing Sheet

(56) References Cited

U.S. PATENT DOCUMENTS

2008/0203783 A1    8/2008   Fehring et al.
2008/0319617 A1   12/2008   Takemura

FOREIGN PATENT DOCUMENTS

| | | |
|---|---|---|
| DE | 102008050316 A1 | 5/2010 |
| DE | 102008050317 A1 | 5/2010 |
| DE | 102009033689 A1 | 1/2011 |
| DE | 102009056990 A1 | 6/2011 |
| DE | 102010053352 A1 | 6/2012 |
| DE | 102011106247 A1 | 1/2013 |
| JP | 2007245877 A | 9/2007 |
| WO | 2015052193 A1 | 4/2015 |

OTHER PUBLICATIONS

Office Action dated May 2, 2022 in related/corresponding DE Application No. 10 2018 002 559.5.
International Search Report dated May 27, 2019 in related/corresponding International Application No. PCT/EP2019/056903.
Office Action dated Dec. 10, 2018 in related/corresponding DE Application No. 10 2018 002 559.5.
Written Opinion dated May 27, 2019 in related/corresponding International Application No. PCT/EP2019/056903.

* cited by examiner

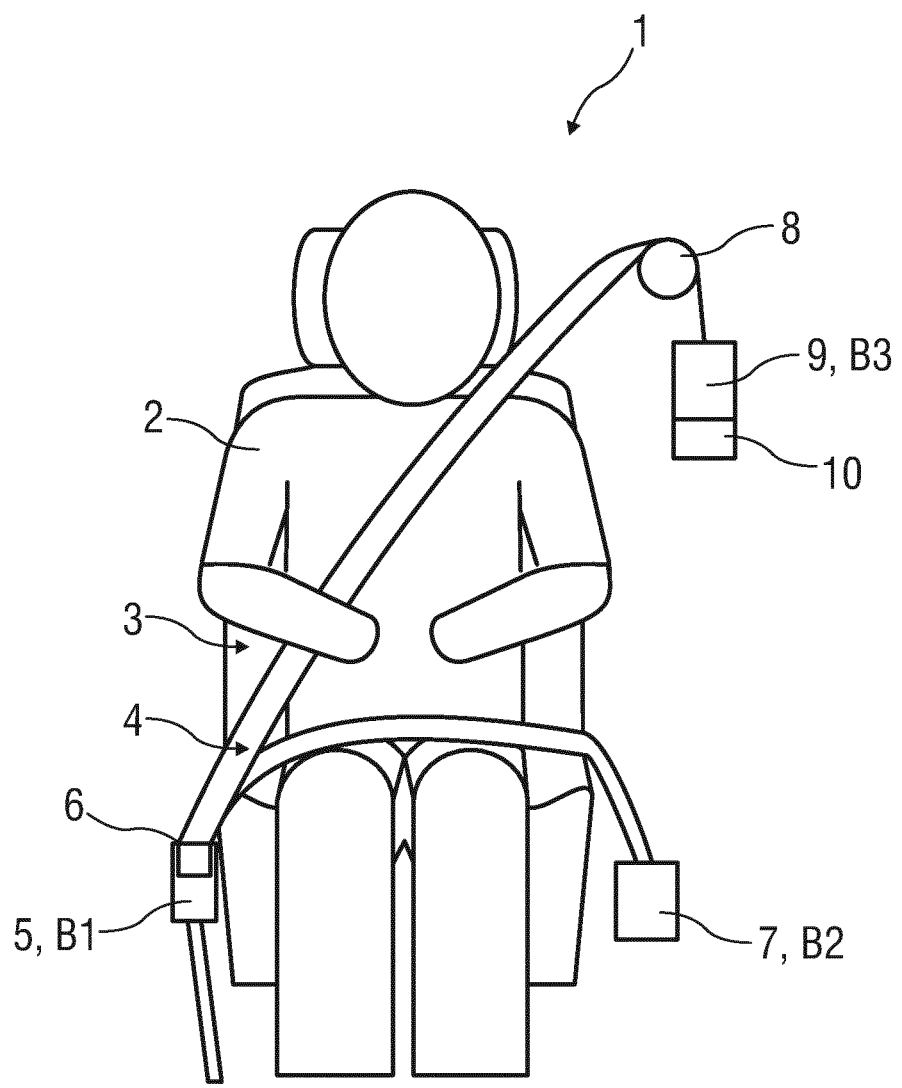

METHOD FOR A DYNAMIC FIXATION

BACKGROUND AND SUMMARY OF THE INVENTION

Exemplary embodiments of the invention relate to a method for the dynamic fixation of an occupant wearing a seatbelt on a vehicle seat, wherein a lateral acceleration of the vehicle and a road course ahead of the vehicle are determined.

DE 2008 050 316 A1 discloses a method and a device for the dynamic fixation of a vehicle occupant wearing a seatbelt on a seat of a vehicle in which lateral dynamics of the vehicle are determined. A slack in the belt of the seatbelt is at least partially retracted by means of a belt retractor when an upper threshold value of the lateral dynamics is exceeded and a bend radius of a road course ahead remains constant or decreases.

In addition, DE 10 2008 050 317 A1 discloses a method for the dynamic fixation of a vehicle occupant wearing a seatbelt on a vehicle seat in which lateral dynamics of the vehicle are determined. A slack in the belt of the seatbelt is at least partially retracted by means of a belt retractor when an upper threshold value of the lateral dynamics is exceeded.

Furthermore, a method for a dynamic driving adaptation of an occupant fixation, which takes place by activating at least one means for occupant fixation, is described in DE 10 2009 056 990 A1, wherein the method determines a point in time for the activation. Information about a future road course of a navigation system and current vehicle data are taken into account here. In a first step, a bend progression and a bend beginning of the bend progression of a bend are first roughly determined using road course data and a current vehicle position. In a second step, a more precise determination of an exact beginning of the bend and thus of the course of the bend is carried out, in which the exact beginning of the bend or a distance from the exact beginning of the bend is determined by an image-evaluating camera system or by a beam measurement. The point in time for the activation of the occupant fixation is also made dependent on a time period which is expected to be needed until the vehicle position will reach the exact beginning of the bend.

Furthermore, DE 2010 053 352 A1 discloses a method for a dynamic driving adaptation of an occupant fixation, which is carried out by activating at least one means for occupant fixation, wherein the method determines a point in time for the activation, taking into account current vehicle data. The method also provides that a determination of a bend beginning and a bend progression are determined by an image-evaluating camera system or by a beam measurement. The point in time for the activation of the occupant fixation is made dependent on a time period expected to be needed until the vehicle reaches the beginning of the bend.

Furthermore, DE 10 2009 033 689 A1 discloses a vehicle seatbelt system comprising a reversible belt tensioner and, if a bend ahead is detected, a control unit causes a belt tightening force to increase to an optimum value for the maximum curvature of the bend at an early stage, such that the maximum belt tightening force is reached shortly before the maximum curvature and can then be lowered again after the maximum curvature or held for further cornering. Any change in the belt tightening force takes place continuously and so slowly that it is hardly noticeable to the vehicle occupant and is in any case perceived as pleasant.

In addition, US 2007 0 102 915 A1 discloses a vehicle seatbelt system which uses vibrations to alert the driver to possible dangerous situations.

Exemplary embodiments of the invention are directed to a method, which is improved compared to prior art, for the dynamic fixation of an occupant wearing a seatbelt on a vehicle seat.

In accordance with the invention, a method for the dynamic fixation of an occupant wearing a seatbelt on a vehicle seat, wherein a lateral acceleration of the vehicle and a road course ahead of the vehicle are determined, provides that the seatbelt is tightened with a predetermined belt force for a predetermined period of time before entering a bend having a predetermined curvature.

By tightening the seatbelt before entering the bend, the occupant on the vehicle seat is made aware of the cornering, wherein the tightening can represent a haptic warning to the occupant before the bend in which an increased lateral acceleration acting on the occupant is to be expected. The occupant, which is in particular the driver of the vehicle, thus has the possibility of braking and thus reducing a current speed of the vehicle, whereby any risk of accident which may be present can be at least substantially reduced.

In this way, the method serves for driving-adapted occupant fixation, whereby the occupant is fixed in the vehicle seat and thus a lateral displacement of the occupant in the vehicle seat in the direction of the outside of a bend is counteracted.

In an embodiment of the method, a maximum lateral acceleration occurring when driving through a bend appearing ahead of the vehicle is predicted, wherein, if a predetermined threshold value of the lateral acceleration is exceeded, the seatbelt is tightened with the predetermined belt force for the predetermined period of time before the predicted maximum lateral acceleration is reached.

If the maximum lateral acceleration to be expected during the bend is above the predetermined threshold at the point of the bend having the highest curvature, then the seatbelt is tightened at the beginning of the bend before any lateral acceleration which is measurable or can be significantly felt by the occupant, and hence a lateral displacement of the occupant, occurs. Here, the seatbelt is tightened in such a way that it lies relatively close to the body of the occupant. If the vehicle passes through the bend and it causes a certain lateral acceleration on the vehicle, a belt buckle prescribed as standard engages, such that a length of the seatbelt cannot change and the belt force passively complies with how strongly the occupant is pressed into the seatbelt by the inertial forces acting in the lateral direction. An active readjustment, in particular an active tightening of the seatbelt with a predetermined belt force, is therefore not necessary.

A further embodiment of the method provides that, in the event of a predicted lateral acceleration exceeding a predetermined threshold value, the seatbelt is tightened with a predetermined belt force, wherein, if a higher predetermined further threshold value is exceeded when driving through the bend, the seatbelt is tightened with a predetermined higher belt force.

In the case of a predicted lateral acceleration exceeding a predetermined threshold value, the seatbelt is tightened with a predetermined belt force, wherein when a higher predetermined further threshold value is exceeded when driving through the bend, the seatbelt is tightened with a predetermined higher belt force. If the further threshold value is exceeded, the seatbelt is thus tightened with a noticeably higher belt force, whereby the occupant is made aware of the increase in lateral acceleration.

The occupant is thus warned, wherein the warning occurs in two stages by tightening the seatbelt. Alternatively, the seatbelt tightening can also occur as a warning in several stages, i.e., more than two stages.

In the case of a predicted critical lateral acceleration, it is provided in a development that the tightening of the seatbelt occurs in a pulsating manner. By means of the pulsating tightening of the seatbelt, the occupant, i.e., the driver of the vehicle, is warned comparatively emphatically before the bend and is prompted to reduce the current driving speed.

In a possible embodiment, the maximum lateral acceleration when driving through a bend is determined on the basis of recorded curvature data and a recorded current vehicle speed and/or on the basis of a driver type.

In this way, it is determined how sportily the bend is being driven through by the vehicle and what maximum lateral acceleration is probably to be expected. The lateral acceleration that is to be expected in the course of the bend to be driven through is thus determined on the basis of the intrinsic speed of the vehicle and/or the driver type and the curvature of the bend, i.e., the driving route.

In another possible embodiment, a current acceleration of the vehicle is taken into account when determining the maximum lateral acceleration, such that the maximum lateral acceleration can be determined relatively accurately. Here, both positive and negative acceleration, i.e., deceleration of the vehicle, are taken into account.

The threshold value and/or the further threshold value are/is predetermined speed-dependently in a possible development, such that the threshold value is adjusted in relation to the current driving speed and the curvature of the bend.

A design of the method provides that the course of the road is determined by means of recorded image data from at least one image acquisition unit on board the vehicle and/or by means of map data available on a central computer unit and/or on board the vehicle.

Preferably, the course of the road is determined both on the basis of the recorded image data and on the basis of the map data, such that accuracy can be increased with regard to the determination of the course of the road. This, in turn, makes it possible to be able to determine the lateral acceleration as the basis for tightening the seatbelt largely appropriately, in order to tighten the seatbelt with the belt force provided in each case, if necessary.

Particularly preferably, the seatbelt is tightened with the predetermined belt force after a period of 2 seconds to 3 seconds before a predicted reaching of the predetermined threshold value in relation to the predicted lateral acceleration. By tightening the seatbelt before reaching the threshold value, i.e., before a noticeable lateral acceleration occurs, it is possible that the tightening can be regarded as a haptic bend warning.

Thus, the tightening of the seatbelt always occurs in the consistent lead time before the actual noticeable occurrence of lateral acceleration, such that the tightening of the seatbelt is perceived as relatively plausible.

If the occupant, i.e., the driver of the vehicle, is aware of this function and the driver feels the seatbelt tightening when approaching a bend, the occupant intuitively knows that a relatively considerably lateral acceleration can be expected in the following seconds. The function is particularly useful if the occupant, i.e., the driver, is driving on an unknown route and the following bend is not visible in its further course.

Preferably, the acquired image data of the at least one image acquisition unit can be checked with regard to plausibility by means of the determined map data and/or the determined map data is checked with regard to plausibility by means of the acquired image data of the at least one image acquisition unit. In this way, the accuracy with respect to the determination of the course of the road can be increased, whereby the accuracy in the determination of the lateral acceleration can in turn be increased.

BRIEF DESCRIPTION OF THE DRAWING FIGURE

Exemplary embodiments of the invention are explained in more detail in the following using a drawing.

Here is shown:

FIG. 1 schematically, a section of a vehicle with an occupant on a vehicle seat and wearing the seatbelt.

DETAILED DESCRIPTION

In the single FIGURE, a section of a vehicle 1 with an occupant 2 on a vehicle seat 3 and wearing the seatbelt 4 is depicted. The occupant 2 is a driver of the vehicle 1, who will be referred to as driver 2 in the following.

The seatbelt 4 is a three-point belt, such that the driver 2 is connected to three fastening points B1 to B3 of a vehicle body when the seatbelt 4 is worn.

A belt buckle 5, into which a belt buckle tongue 6, which can be arranged on the seatbelt 4 in a displaceable manner, can be inserted, forms a first fastening point B1. A second fastening point B2 is formed by an end fitting 7 and a third fastening point B3 is formed by a deflector 8 or a belt retractor 9 of the seatbelt 4. In the present exemplary embodiment, the third fastening point B3 is formed by the belt retractor 9.

In the present exemplary embodiment, the belt retractor 9 is coupled to a reversible belt tensioner 10, wherein, alternatively or additionally, the end fitting 7 and/or the belt buckle 5 can be coupled to such a reversible belt tensioner 10.

If the occupant 2 puts on his seatbelt 4 and the belt buckle tongue 6 is inserted into the belt buckle 5, the belt tensioner 10 is controlled in such a way that the seatbelt 4 is tightened and a belt slack is reduced. After tightening, the seatbelt 4 lies substantially tightened on the body of the driver 2.

The belt tensioner 10 is driven by an electric motor and is therefore reversible, i.e., can be activated multiple times, wherein a tensioning path is largely unlimited, since the electric motor drive acts on an axis of the belt retractor 9.

In addition to reducing belt slack when the seatbelt 4 is worn, the belt tensioner 10 is used as a preventive occupant protection device.

If it is determined from signals detected by a surroundings sensor system that the vehicle 1 is about to collide or the collision itself is being detected, the belt tensioner 10 is activated to reduce the belt slack such that the seatbelt 4 lies tightened against the body the body of the driver 2, such that this participates in a collision-related overall deceleration of the vehicle 1 comparatively early.

In addition, the belt tensioner 10 is used for driving-adapted occupant fixation, as can be seen from prior art. Here, the seatbelt 4 is preferably tightened during sporty cornering in order to fix the driver 2 in his vehicle seat 3 and to counteract his lateral displacement to the outside of the bend.

The vehicle 1 has at least one image acquisition unit not depicted in more detail, the detection range of which is directed in front of the vehicle 1 and which continuously acquires image data while the vehicle 1 is in driving mode.

Furthermore, map data are stored in the vehicle 1, for example as a component of a navigation system, wherein the map data can also be made available by means of a central computer unit to which the vehicle 1 is connected via a radio link.

In the described exemplary embodiment, it is provided that the map data are available in the vehicle 1 and have been and are regularly updated.

In order to improve the occupant fixation with regard to a cornering of the vehicle 1, a method described in more detail is provided.

By means of the map data and the recorded image data of the at least one image acquisition unit of the vehicle 1, a road course ahead of the vehicle 1 is determined. It is therefore known when the vehicle 1 is approaching a bend in the road.

On the basis of the map data and/or the acquired image data, curvature data concerning a next bend can be determined.

These curvature data are evaluated in terms of how far the vehicle 1 is from an apex of the bend.

Furthermore, the determined curvature data in conjunction with a current driving speed of the vehicle 1 are used to estimate how sportily the bend will be driven through and what maximum lateral acceleration is to be expected when driving through the bend. Alternatively or additionally, it can be determined on the basis of a driver type how sportily the bend will be driven through and what maximum lateral acceleration is to be caused by this.

The accuracy of this prediction can be increased if a current acceleration of the vehicle 1 is taken into account when determining the maximum lateral acceleration.

In other words, the lateral acceleration to be expected in the course of the bend to be driven through is determined on the basis of the intrinsic speed of the vehicle 1 and the curvature of a route ahead of the vehicle 1. Thus, a lateral acceleration prediction is created.

If the lateral acceleration to be expected in the course of the bend is above a predetermined threshold value at its maximum value, i.e., at the point of the bend with the greatest curvature, then the seatbelt 4 can be tightened with a predetermined belt force before the bend begins. The seatbelt 4 is thus tightened before a measurable lateral acceleration or a lateral acceleration which is noticeably perceptible for the driver 2 occurs and thus before a lateral displacement of the driver 2 in his vehicle seat 3 occurs.

In particular, the threshold value is speed-dependent, such that the threshold value is set lower at a comparatively high current driving speed than it would be if the vehicle 1 were to drive more slowly.

If the threshold value is exceeded, the belt force acting on the seatbelt 4 is increased moderately, such that the belt slack is reduced and the seatbelt 4 fits comparatively tightly against the body of the driver 2.

Since a design which is advantageous and plausibly experienced with regard to the tightening of the seatbelt 4 provides a threshold value above 0.3G, a standard belt buckle is activated anyway in the course of the bend, such that the extension length of the seatbelt 4 cannot be changed, i.e., the seatbelt 4 does not yield any more. The belt force depends exclusively passively on how strongly the driver 2 is pressed into the seatbelt 4 by the inertial forces acting in the transverse direction. An active adjustment of the belt force is therefore not necessary in the course of the bend.

In particular, the accuracy with respect to the road ahead of the vehicle 1 is increased when map data are evaluated along a so-called "most probable path" calculated by telematics, that a most probable path, because then a road course of up to 8 km ahead of the vehicle 1 can be determined.

In a possible embodiment, it is provided that not the whole course of the bend ahead of the vehicle 1 is included in an assessment as to whether the predetermined threshold value will be exceeded with respect to the lateral acceleration, but rather only a fixed lead time is considered.

In the case of very long bends, where the curvature increases very slowly and the apex is reached only after a few seconds, consideration of the whole bend can lead to the effect that the tightening of the seatbelt 4 takes place a long time before a significant lateral acceleration is reached. A tightening of the seatbelt 4 occurring in this way can be experienced by the occupant 2 as implausible.

If, however, only the course of the road for the following 2 seconds or 3 seconds of driving is analyzed with regard to the curvature and thus with regard to the anticipated lateral acceleration to be expected, the tightening of the seatbelt 4 always occurs in the same lead time to the lateral acceleration which can actually be felt. In general, a tightening of the seatbelt 4 carried out in this way is experienced as plausible.

If the seatbelt 4 is tightened with a lead time of at least 2 seconds to 3 seconds before the predicted threshold value of the lateral acceleration is reached, the tightening represents a haptic bend warning.

If the driver 2 knows about a function of the seatbelt tensioner 10 for dynamic occupant fixation, and if the driver 2 feels the seatbelt 4 being tightened when approaching a bend, the driver 2 knows intuitively that a substantially considerable lateral acceleration is to be expected in the following seconds.

This function is particularly useful if the driver 2 is driving on an unknown route and the following bend is not visible to the driver 2 in its further course.

In addition, the method for dynamic occupant fixation provides that the haptic bend warning occurs in two or more stages by tightening the seatbelt 4.

If a lateral acceleration acting above the predetermined threshold value is expected in the following bend, the tightening of the seatbelt 4 occurs with a comparatively low belt force. In the event that it is determined that the current driving speed of the vehicle 1 and the impending curvature of the bend will cause a further predetermined threshold value, which is above the predetermined value, to be exceeded, the tightening of the seatbelt 4 occurs with a higher belt force, such that the tightening is noticeably stronger.

If it is determined, on the basis of the current driving speed of the vehicle 1 and the impending curvature of the curve, that the lateral acceleration exceeds a critical threshold value, it is provided that the seatbelt 4 is tightened in a pulsating manner as a haptic warning. The pulsating warning warns the driver 2 in relation to the next bend and prompts the driver to reduce his/her speed to pass through the bend.

The bend warning by tightening the seatbelt 4 can only occur where curvature data relating to the course of the road is available from map data and/or the recorded image data of the at least one image acquisition unit of the vehicle 1.

Depending on a quality and availability of the curvature data from the map data and the recorded image data, a combination of the curvature data can occur in the form of a mutual plausibility check. For this purpose, for example, an averaging or a weighted averaging can be carried out if the curvature data determined from the map data and the image data have different values.

In a further embodiment of the method, it is provided that the driving-adapted occupant fixation draws on a road course forecast as well as curvature data that have already been merged and/or checked with regard to plausibility in another module, for example of the vehicle 1 and/or the central computer unit. With regard to the merging and/or the plausibility check, other sources and/or sensor data can also be included, such that the road course ahead of the vehicle 1, in particular a geometry of the road course, can be described as reliably and precisely as possible to tighten the seatbelt 4.

In order to carry out the method that the seatbelt 4 is tightened depending on a predicted lateral acceleration before the lateral acceleration occurs, the amount of time required by the belt tensioner 10 to generate the desired belt force during tightening is taken into account. At a given driving speed, an activation period of the belt tensioner 10 can be converted into a driving distance. This makes it possible to activate the tightening of the seatbelt 4 early enough that its effect already occurs at the beginning of the bend.

In addition, the method also provides that, depending on the determined course of the road ahead of the vehicle 1, the tightening of the seatbelt 4 is not reversed after a bend has been passed through if the course of the road indicates that the next bend will already follow after it.

In particular, the determination of the course of the road is based on the recognition of road markings in the acquired image data and the calculation of clothoid parameters of a section of the road ahead of the vehicle 1 and on the provision of exact geometric map data from existing road maps.

Since substantially only a driving distance of the road course of about 100 meters to 200 meters is relevant for the implementation of the method for driving-adaptive, i.e., dynamic occupant fixation during cornering, but such a section can only be detected by means of the at least one image acquisition unit in comparatively favorable road situations, the use of map data is in most cases an essential part of the method.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 1 vehicle
2 occupant/driver
3 vehicle seat
4 seatbelt
5 belt buckle
6 belt buckle tongue
7 end fitting
8 deflector
9 belt retractor
10 belt tensioner
B1 first fastening point
B2 second fastening point
B3 third fastening point

The invention claimed is:

1. A method for the dynamic fixation of an occupant wearing a seatbelt on a vehicle seat of a vehicle, the method comprising:
   determining a lateral acceleration of the vehicle and a road course ahead of the vehicle;
   predicting a maximum lateral acceleration occurring when driving through a bend ahead of the vehicle; and
   tightening the seatbelt with a first predetermined belt force for a predetermined period of time
      responsive to the predicted maximum lateral acceleration exceeding a first predetermined threshold value, wherein the predetermined period of time is before the vehicle reaches the predicted maximum lateral acceleration, or
      responsive to the bend having a predetermined curvature, wherein the predetermined period of time is before the vehicle enters the bend having the predetermined curvature;
   determining whether a lateral acceleration of the vehicle while the vehicle is driving through the bend exceeds a second predetermined threshold value; and
   tightening the seatbelt with a second predetermined belt force, which is higher than the first predetermined belt force, responsive to the determination that the lateral acceleration of the vehicle while the vehicle is driving through the bend exceeds the second predetermined threshold value, which is higher than the first predetermined threshold value.

2. The method of claim 1, wherein when the predicted maximum lateral acceleration is equal to or greater than a critical lateral acceleration, the tightening of the seatbelt occurs in a pulsating manner.

3. The method of claim 1, wherein the maximum lateral acceleration when driving through the bend is determined based on recorded curvature data and a recorded current driving speed of the vehicle and/or based on a driver type.

4. The method of claim 1, wherein the determination of the maximum lateral acceleration accounts for a current acceleration of the vehicle.

5. The method of claim 1, wherein the first and second predetermined threshold values are predetermined depending on speed of the vehicle.

6. The method of claim 1, wherein the road course is determined based on acquired image data from at least one image acquisition unit of the vehicle and/or based on map data available on a central computer unit and/or on board the vehicle.

7. The method of claim 1, wherein the seatbelt is tightened with the first predetermined belt force after a period of 2 seconds to 3 seconds before a predicted reaching of the first predetermined threshold value with respect to the predicted maximum lateral acceleration.

8. The method of claim 6, wherein
   the acquired image data from the at least one image acquisition unit are checked with regard to plausibility by using the map data, and/or
   the map data are checked with regard to plausibility using the acquired image data of the at least one image acquisition unit.

* * * * *